United States Patent

Yoshino et al.

[11] Patent Number: 5,281,011
[45] Date of Patent: Jan. 25, 1994

[54] ANTILOCK CONTROL DEVICE

[75] Inventors: Masato Yoshino, Itami, Japan; Shunsuke Kawasaki, Southgate, Mich.; Fumio Kageyama; Shinji Umehira, both of Hiroshima, Japan

[73] Assignee: Sumitomo Electric Industries, Ltd., Hyogo, Japan

[21] Appl. No.: 817,617

[22] Filed: Jan. 7, 1992

Related U.S. Application Data

[63] Continuation of Ser. No. 310,830, Feb. 8, 1989, Pat. No. 5,102,204.

[30] Foreign Application Priority Data

Feb. 9, 1988 [JP] Japan .................................. 63-28252

[51] Int. Cl.$^5$ .................................................. B60T 8/66
[52] U.S. Cl. .................................. 303/113.4; 303/92; 303/100; 192/1.4
[58] Field of Search ............... 303/113 SS, 113 R, 92, 303/116 R, 113.4, 100, 113.1, 116.1; 364/426.02

[56] References Cited

U.S. PATENT DOCUMENTS

| | | | |
|---|---|---|---|
| 2,266,213 | 12/1941 | Kattwinkel | 192/1.4 |
| 3,895,698 | 7/1975 | Fontaine | 303/19 |
| 4,576,417 | 3/1986 | Dobner | 303/15 |
| 4,708,406 | 11/1987 | Takagi et al. | 303/116 R |
| 4,717,207 | 1/1988 | Kubota et al. | 303/3 |
| 4,790,607 | 12/1988 | Atkins | 303/109 |
| 4,807,944 | 2/1989 | Weise | 303/113 SS |
| 4,826,255 | 5/1989 | Volz | 303/10 |
| 4,861,117 | 8/1989 | Reinartz et al. | 303/100 |

*Primary Examiner*—Matthew C. Graham
*Attorney, Agent, or Firm*—Wenderoth, Lind & Ponack

[57] ABSTRACT

An antilock control device for the brake assembly of a motor vehicle having the function of detecting ON and OFF signals supplied from a brake lamp switch and representative of the operative and inoperative positions of the brake pedal. When the signal changes from OFF to ON, which means that the brake pedal has been trodden, the antilock control function is disabled so that the pressure generated in the master cylinder will be directly applied to the wheel cylinders. This state continues until the antilock device detects a locking tendency of any wheel. In addition to the brake lamp switch signals, signals representative of the ON and OFF positions of the accelerator pedal may be supplied to the antilock control device so that the antilock control function will be disabled when either the accelerator pedal position signal changes from OFF to ON or the brake pedal position signal changes from ON to OFF.

2 Claims, 5 Drawing Sheets

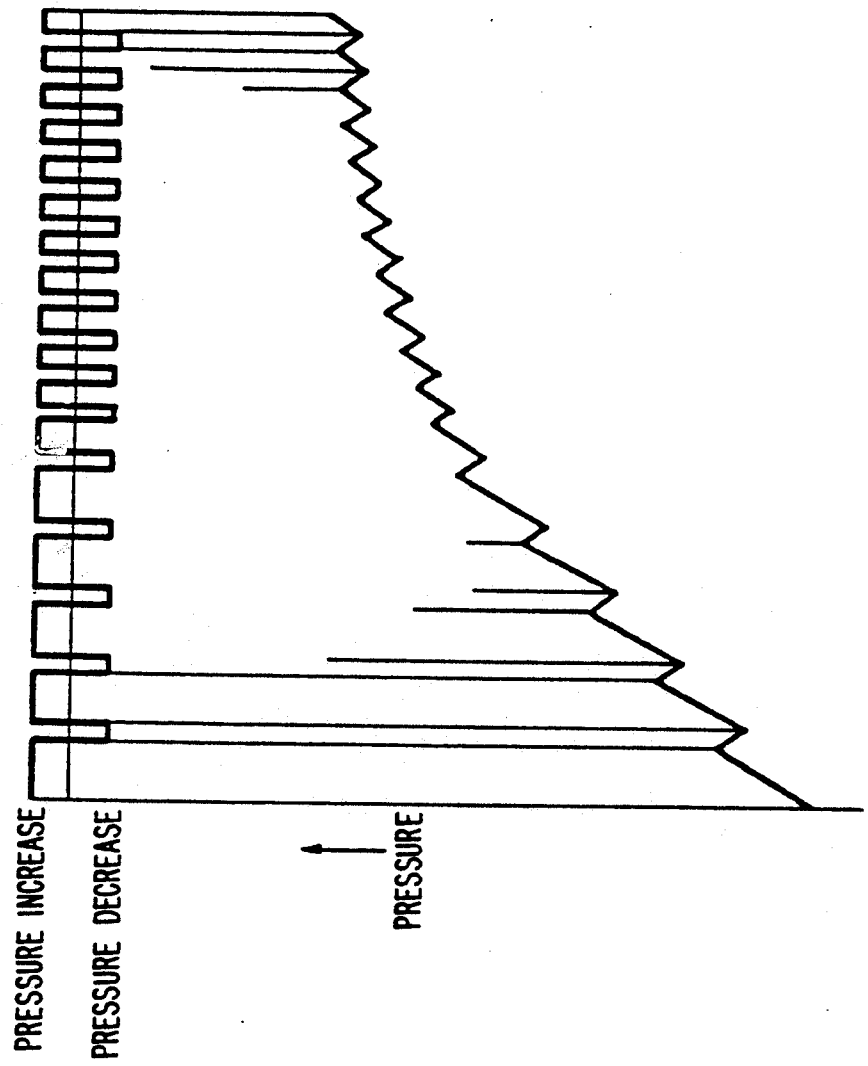

ANTILOCK CONTROL DEVICE

This application is a continuation of allowed application Ser. No. 07/310,830, filed Feb. 8, 1989 now U.S. Pat. No. 5,102,204.

BACKGROUND OF THE INVENTION

The present invention relates to an antilock control device for efficiently operating the braking system of a motor vehicle even in case of a cadence brake.

An antilock brake control device is designed to detect the locking tendency of any wheel and reduce the hydraulic pressure in the brake wheel cylinder for the locking wheel to a lower level than the hydraulic pressure in a master cylinder controlled by the driver, thereby preventing the wheel from locking.

After the wheel has cleared out of the locking tendency, it is now necessary to increase the hydraulic pressure in the wheel cylinder because otherwise the braking force would be insufficient. But if the hydraulic pressure in the master cylinder is applied to the wheel cylinder too quickly, the wheel may soon fall into a locking state again. Thus, it is necessary to increase the hydraulic pressure in the wheel cylinders not sharply but gradually. For this purpose, it was proposed to provide the hydraulic circuit with two functions, i.e. the function of holding the pressure in the wheel cylinders and the function of bringing the wheel cylinders into direct communication with the master cylinder to increase the pressure in the wheel cylinders. With this arrangement, the hydraulic pressure in the wheel cylinders can be increased gradually while repeating the pressure increase and the pressure hold. For the same purpose, it was also proposed to provide a throttle valve or a flow control valve in the hydraulic circuit to selectively repeat a sharp pressure increase and a moderate pressure increase.

When the automobile is running on a rough surface, some of its wheels might be judged from the signals from the wheel speed sensors as if they are falling into a locking state in spite of the fact that the brake pedal is not operated, thus causing the antilock device to give a pressure reduction command. Even after the automobile has passed the rough surface and the wheels have been judged to be recovering from the locking state, the wheel cylinders are kept not in direct communication with the master cylinder as discussed above. If the brake pedal is trodden in such a situation, the hydraulic pressure generated in the master cylinder will not be transmitted to the wheel cylinders directly and smoothly, thus delaying the braking effect.

As one solution to this problem is to provide means for judging whether the brake pedal is in its operative or inoperative position by checking e.g. signals representative of the ON or OFF position of a stop lamp switch to keep the antilock device inoperative, i.e. keep the master cylinder in communication with the wheel cylinders as long as the brake pedal is in its inoperative position. This will allow the hydraulic pressure in the wheel cylinders to reach the pressure level in the master cylinder as soon as possible. But this solution has one drawback that the signals representative of the operative and inoperative positions of the brake pedal are not necessarily reliable. For example, the signal may remain OFF even if the brake pedal is actually put into its operative position, or it may remain ON even if the brake pedal is not trodden owing to the fusing of the switch.

SUMMARY OF THE INVENTION

It is an object of the present invention to provide an antilock control device which operates normally even if a brake pedal position detector is out of order and which will not cause a delay in the braking action as far as the detector is working normally.

When an antilock device finds that a wheel is recovering from a locking state, it will give either a combination of brake pressure increase and hold commands or a combination of sharp and moderate brake pressure increase commands. The hydraulic circuit is controlled exactly in conformity with these commands. Thus, even if the brake pedal is trodden in this state, the hydraulic pressure generated in the master cylinder by operating the brake pedal would not be directly applied to the wheel cylinders. According to the present invention, the hydraulic pressure in the master cylinder will be directly applied to the wheel cylinders, when either the brake pedal position detector detects a change of signal from OFF to ON or the accelerator pedal position detector detects a change of signal from ON to OFF.

According to the present invention, the brake pedal position signals are supplied to the antilock control device. This will allow the brakes to be applied reliably by treading of the brake pedal even while the antilock control is working e.g. due to the fact that the automobile is running on a rough surface. Even if the brake pedal position detector should get out of order, the antilock control device will operate normally, thus ensuring a safe drive.

BRIEF DESCRIPTION OF THE DRAWINGS

Other features and objects of the present invention will become apparent from the following description taken with reference to the accompanying drawings, in which:

FIG. 5 is a graph showing how the pressure changes by alternately increasing and reducing the fluid pressure.

DESCRIPTION OF THE PREFERRED EMBODIMENT

Figure 1:
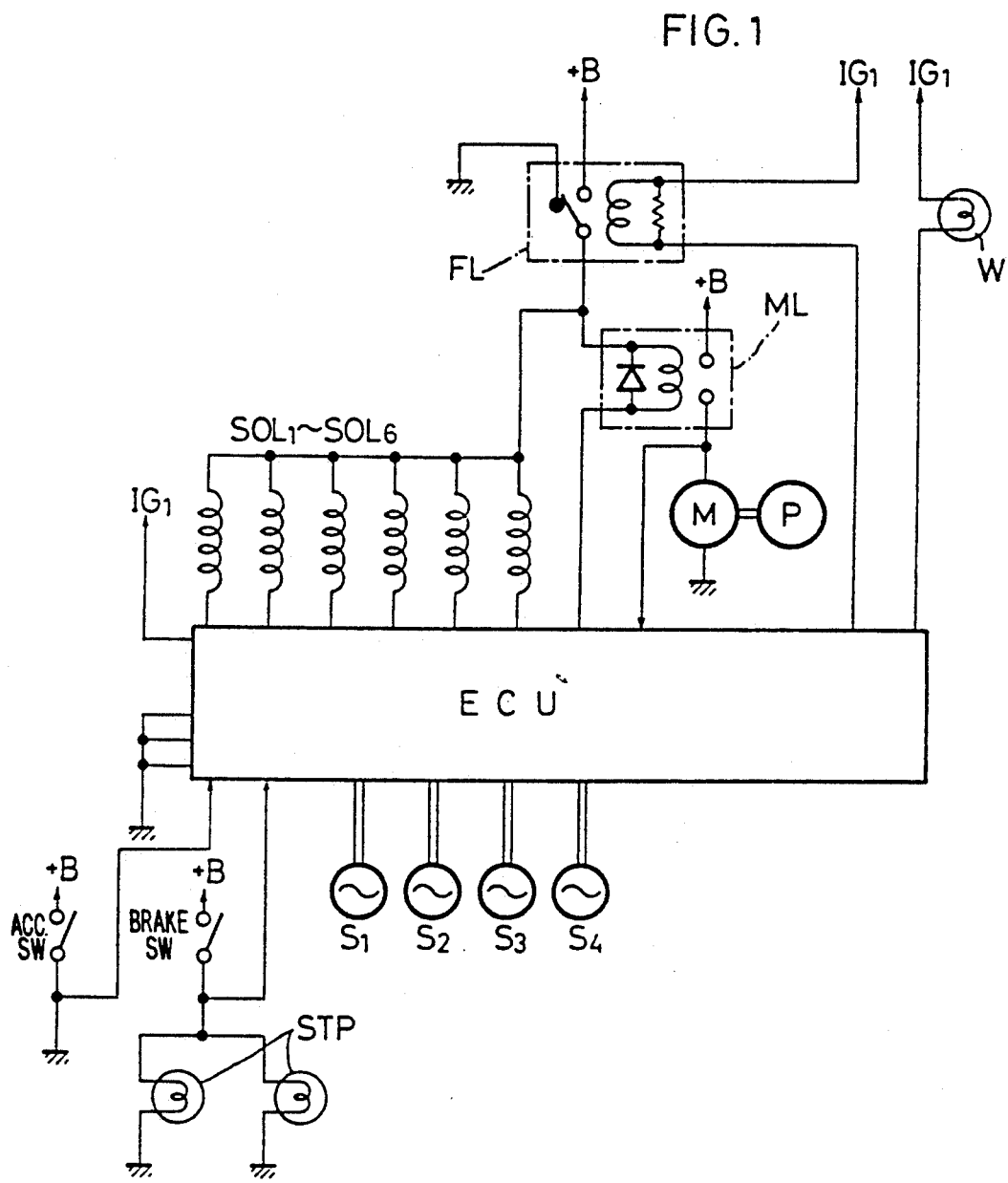
FIG. 1 is an electric circuit diagram of the antilock control device according to the present invention.

Referring to FIG. 1, the antilock control device according to the present invention has an electronic control unit (hereinafter referred to as ECU) which executes various operations and judgements on the basis of the signals from wheel speed sensors S1–S4 to actuate solenoids SOL1–SOL6 in pressure control valves (not shown) for wheel cylinders for actuating wheel brakes and open and close a relay ML for a motor M for driving a pump P in a hydraulic unit (not shown), thereby increasing, holding and reducing the hydraulic pressure in the wheel cylinder for each wheel brake.

The ECU has a monitoring circuit which turns on a warning lamp w when it detects any abnormal state, and simultaneously opens a failsafe relay FL to disable the antilock control, thus allowing manual brake control.

The ON-OFF signals from a brake switch SW for stop lamp STP are applied to the ECU. The ON-OFF signals are processed as brake pedal position signals as will be described in detail later. Similarly, signals from an accelerator switch SW are also supplied to the ECU.

The mark "+B" means that the line is connected to a power source and "IG", does that it is connected to an ignition switch.

Figure 2:
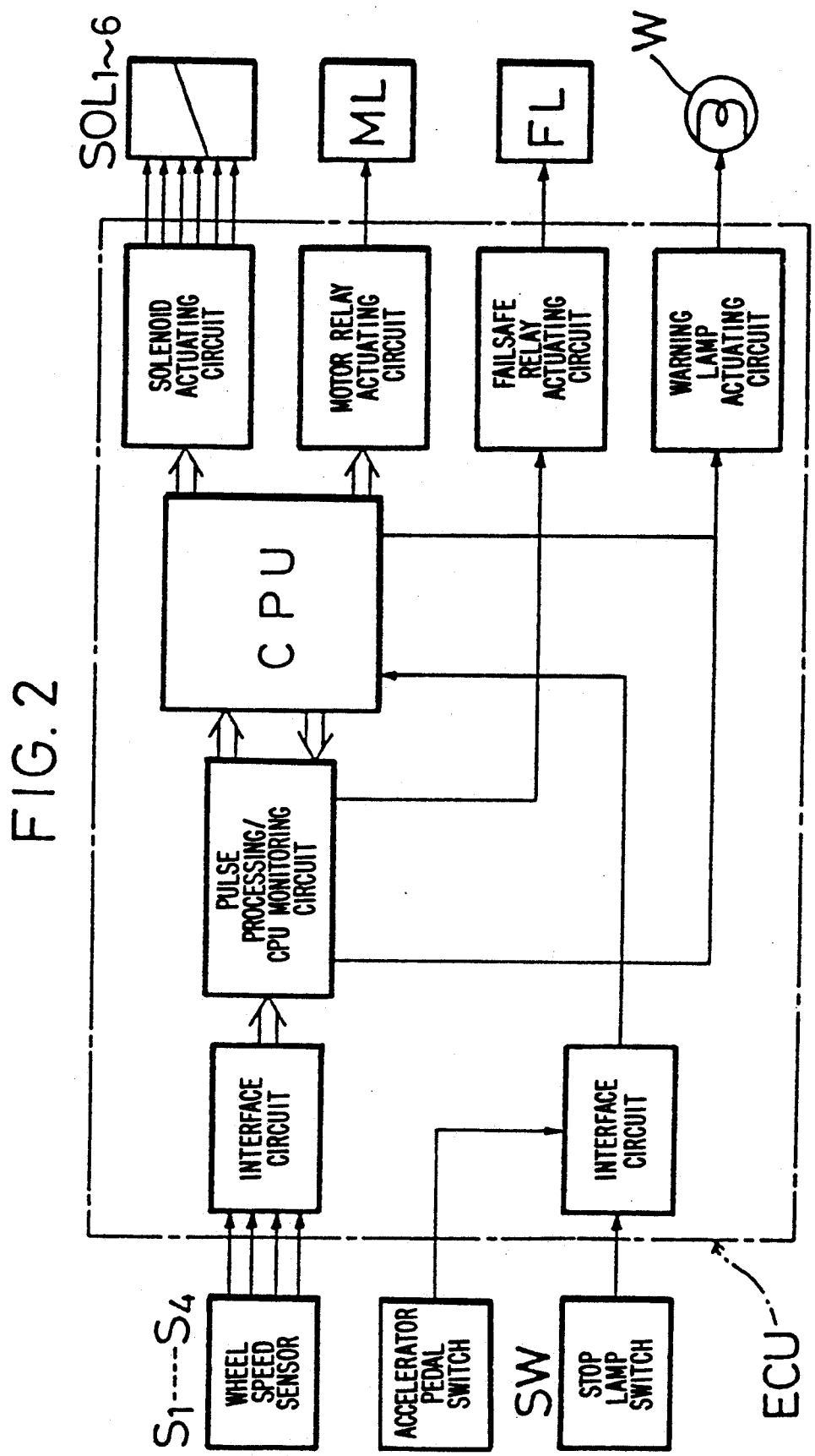
FIG. 2 is a block diagram of the electronic control unit of the same.

The function of the ECU is schematically shown in FIG. 2. The signals from the wheel speed sensors S1 to S4, which are AC voltage signals, are converted into pulses in an interface circuit and given to a pulse processing circuit where the pulses are counted. A CPU then computes and analyzes the pulse counts according to its program and, on the basis of the results of computing gives commands to a solenoid actuating circuit and a motor relay actuating circuit to actuate the solenoids SOL1 to SOL6 for the pressure control valves and the motor relay ML, respectively.

The ON-OFF signals from the brake switch SW for the stop lamps and the accelerator pedal switch are binary-coded in an interface circuit and applied to the CPU so as to be processed according to its program.

Figure 3:
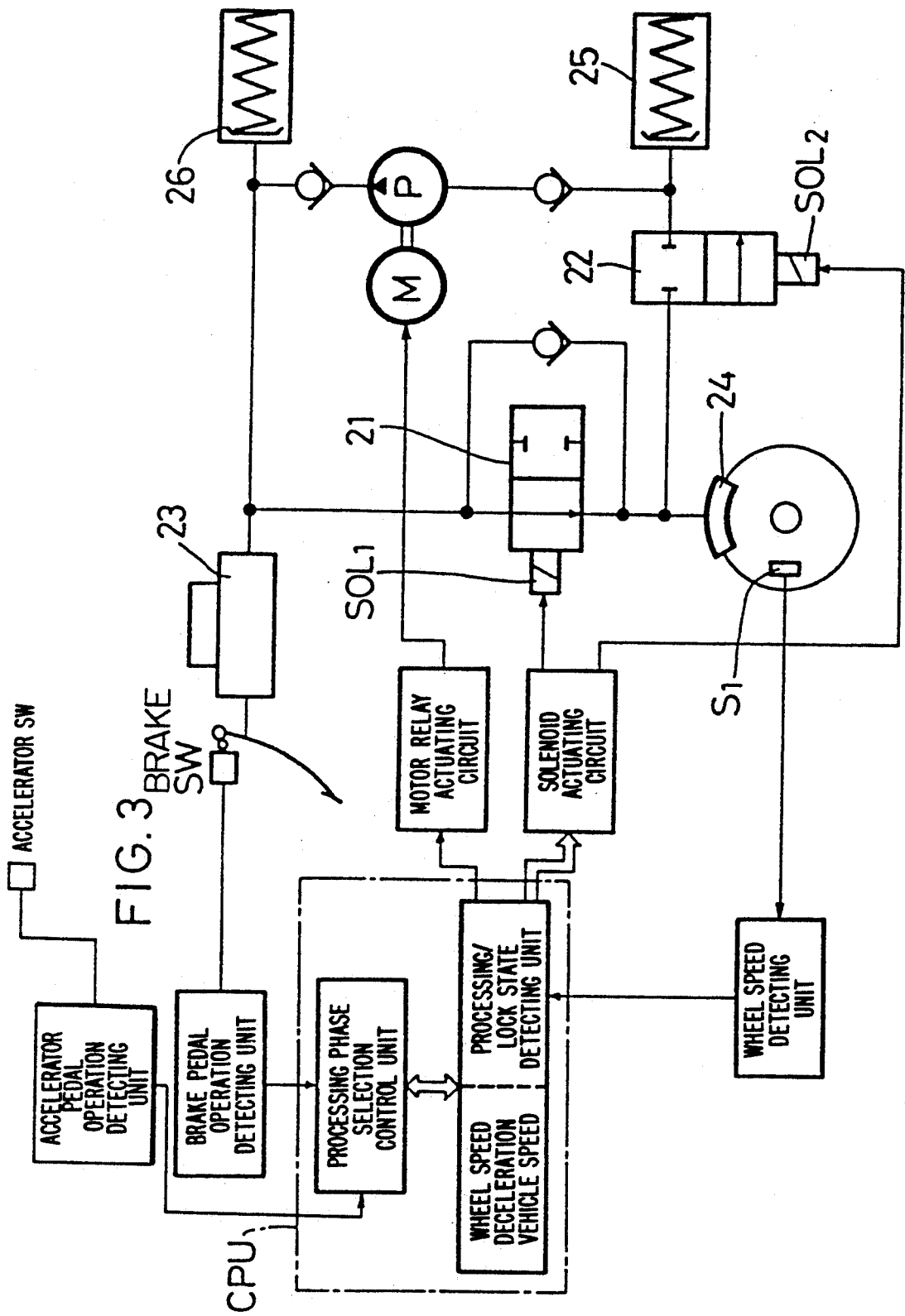
FIG. 3 is a schematic diagram showing how the electronic control unit is related to the hydraulic circuit of the same.

More specifically, as shown in FIG. 3, the signals from the wheel speed sensors S1 are converted into wheel speed signals in a wheel speed detector including an interface circuit and a pulse processing circuit and are applied to a processing/lock state detecting means, which calculates the deceleration, estimated vehicle speed and so forth on the basis of the wheel speed signals to detect any locking tendency of the wheel. If it is judged that the wheel is locking or about to lock, from the fact that the deceleration has fallen below a predetermined value or the slip speed (which is the difference between the estimated vehicle speed and the wheel speed) has exceeded a predetermined value, the lock state detecting means commands the solenoid actuating circuit to reduce the hydraulic pressure. In response to this command, the solenoid actuating circuit will energize the solenoids SOL1 and SOL2 to move a pressure control valve 21 to the lefthand side of FIG. 3 and a pressure control valve 22 upward. This will cause the hydraulic circuit for a wheel cylinder 24 to be cut off from a hydraulic pressure source comprising a master cylinder 23 and an accumulator 26 and bring the hydraulic circuit for the wheel cylinder 24 into communication with that for a reservoir 25. A pump P will then drain the brake fluid in the reservoir 25 back into the accumulator 26 and the master cylinder 24, thus lowering the braking pressure in the wheel cylinder 24.

The wheel speed thus begins to increase. When the deceleration or the slip speed rises above a predetermined value, the lock state detector judges that the wheel has cleared out of the locking tendency and commands the solenoid actuating circuit to increase pressure. The circuit then deenergizes the solenoids SOL1 and SOL2 to allow the pressure control valves 21 and 22 to return to their original positions shown in FIG. 3. Now the hydraulic circuit of the wheel cylinder 24 are brought into communication with the hydraulic pressure source again, thus increasing the brake pressure in the wheel cylinder.

If a pressure hold command has to be given while a pressure increase or pressure reduction command is being given, the solenoid SOL1 may be energized and the solenoid SOL2 be deenergized to move the pressure control valve 21 to the lefthand side of FIG. 3 while keeping the pressure control valve 22 in the position of FIG. 3. In this state, the hydraulic circuit of the wheel cylinder 24 is cut off from both the pressure source and the reservoir 25, so that the brake pressure will be kept constant.

The conditions and timing of giving a pressure hold command while a pressure reduction command is being given may be determined at discretion. For example, a pressure hold command may be given when the duration of the pressure reduction command has reached a predetermined point or when the wheel deceleration has exceeded a threshold value.

Similarly, the conditions and timing of alternately giving the pressure increase command and the pressure reduction command may be determined in any suitable manner. Ordinarily, pressure hold commands are given at equal time intervals by use of e.g. a pulse generator.

The device shown in FIGS. 1 and 2 is a 3-channel control device with three pairs of solenoids, one for the front right wheel, one for the front left wheel and one for both rear wheels. The four wheels may be controlled individually by means of a 4-channel control device.

Other indices than the deceleration or slip speed may be used to judge whether the wheels are on the way to lock or recovering from locking state.

The signals from the brake switch SW are converted into ON-OFF signals representative of the ON and OFF positions of the stop lamp switch in the detector means including the interface circuit and those of the accelerator are fed to a phase selection switch control unit for selecting a processing phase. The ON-OFF signals are then processed logically to control the processing/lock state detecting means.

Figure 4:
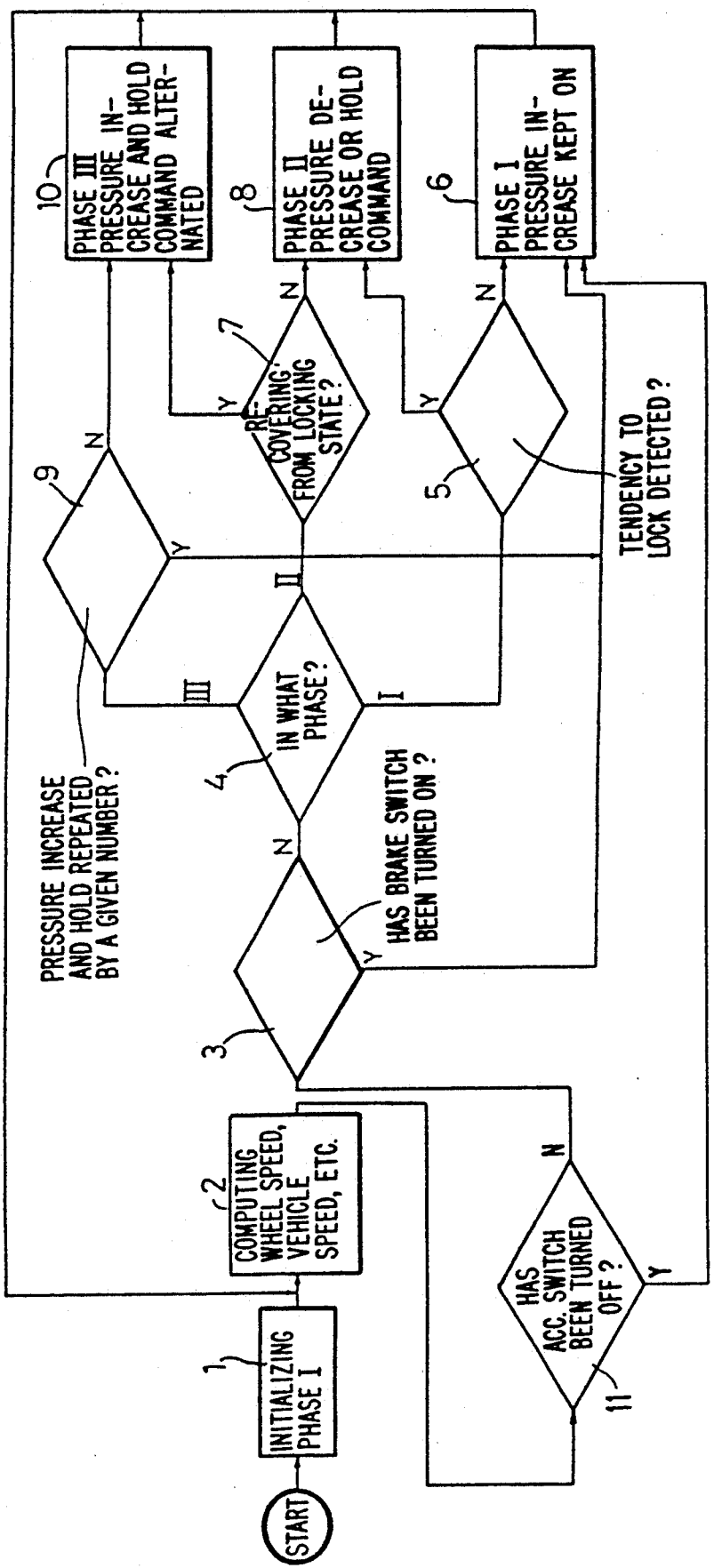
FIG. 4 is a flow chart of the program in the phase selection control unit shown in FIG. 3.

The ON-OFF signals are processed in the order of the flow chart of FIG. 4. The antilock control according to the present invention includes three phases, i.e. Phase I wherein a pressure increase command is normally given, Phase II wherein pressure reduction and pressure hold commands are alternately given, and Phase III wherein pressure increase and pressure hold commands are alternately given.

The routine of FIG. 4 starts at Step 1 wherein the program is initialized and set to Phase I. In Step 2, logical operations are executed to calculate the wheel speed, estimated vehicle speed, wheel deceleration and slip speed to judge whether or not the wheels are in the lock state. The program then proceeds to Step 11 where it is judged whether the accelerator switch has been turned OFF. If it is so judged, to program proceeds to Step 6 and enters into Phase I to keep a pressure increase command. If it is judged no, the program then proceeds to Step 3 wherein it is judged whether the signals from a brake pedal position detector has changed from OFF to ON. If so judged, the program proceeds to Step 6 and enters into Phase I to keep a pressure increase command.

If judged "No" in Step 3, it is checked in Step 4 in which phase the program is. The program proceeds to Step 5 because the phase has been set to I in Step 1. In Step 5, it is judged whether or not the wheel is falling into lock, on the basis of the values obtained as a result of the operations in Step 2. The wheel may be judged to be falling into lock when the slip speed and/or the wheel deceleration has exceeded a threshold value.

If judged No, the program proceeds to Step 6 to enter into Phase I.

If judged Yes in Step 5, the program proceeds to Step 8 to enter into Phase II wherein pressure reduction or pressure hold command is issued. In this phase, the pressure reduction command is basically given and the pressure hold command may be issued when the duration of the pressure reduction command has reached a predetermined point or when the wheel deceleration has exceeded a predetermined threshold value.

If it is judged in Step 4 that the current phase is at phase II, it is judged in Step 7 whether or not the wheels are recovering from locking state. This judgement may be made e.g. by checking whether or not the slip speed or the wheel deceleration or acceleration has exceeded a predetermined threshold value.

If judged No, the program proceeds to Step 8 because the wheels have not recovered from the locking state. If judged Yes in Step 7, the program proceeds to Step 10 to enter into Phase III and thus issue the pressure increase and pressure hold commands alternately. A pulse generator may be employed to allow these two commands to be changed over from one to the other at fixed time intervals.

The program then returns to Steps 2 and 3 from Step 10. If it is judged in Step 3 that the position of the switch SW remains unchanged, because the program is now in Phase 3, it proceeds through Step 4 to Step 9 where the number of issuing of pressure increase and pressure hold commands in Step 10 is counted. If it is over a preset value, the program proceeds to Step 6. If not, the program proceeds to Step 10 and returns to Step 2.

In Phase III, a sharp pressure increase command and a moderate pressure increase command may be alternately given instead of a combination of pressure increase and pressure hold commands. The gradient of pressure increase may be controlled by means of a flow control valve or by use of a pulse duration modulation method in which the ratio of the duration of each pressure increase to that of each pressure reduction is adjusted. The braking pressure can be held constant by making equal the widths or durations of pressure increase and pressure reduction pulses to each other.

In the preferred embodiment, a pressure increase keeping command is given when the ECU detects a signal change from OFF to ON position of the stop lamp switch, i.e. that the brake pedal is now set in its operative position. In addition to such brake pedal position signals, signals representative of the position of the accelerator pedal may be used. In this arrangement, a pressure increase keeping command will be issued if the ECU detects either a signal change representative of the operative position of the brake pedal from its inoperative position or a signal change representative of the inoperative position of the accelerator pedal from its operative position. This ensures a reliable brake control even if the brake pedal switch breaks down. Another advantage of this arrangement is that since the accelerator pedal is usually released to its inoperative position before operating the brake pedal, a pressure increase command can be issued more quickly than when using only the brake pedal position signals, thus improving the responsiveness of control. Practically no problem will be encountered even if a pressure increase keeping command is issued when the accelerator pedal is released.

What is claimed is:

1. An antilock control device, comprising:
    a wheel speed detecting means;
    a processing/lock state detecting means for executing logical operations on the basis of wheel speed signals supplied from said wheel speed detecting means and for effecting antilock control by issuing commands to reduce, hold or increase a brake pressure in accordance with the executed logical operations;
    a solenoid actuating means for actuating solenoids for pressure control valves in brake pressure circuits in response to said commands to reduce, hold or increase a brake pressure from said processing/lock state detecting means when said processing/lock state detecting means is activated to effect the antilock control;
    a brake pedal position detecting means for detecting whether a brake pedal is in its operative ON or inoperative OFF position; and
    a control means for controlling the brake pressure according to the antilock control effected by said processing/lock state detecting means when said processing/lock state detecting means is activated to effect the antilock control and for otherwise bringing said brake pressure up to a hydraulic pressure of a master cylinder as quickly as possible, initializing means initially deactivating the antilock control of said processing/lock state detecting means when said brake pedal position detecting means detects that the brake pedal has changed from the inoperative OFF position to the operative ON position and said control means subsequently reactivating the antilock control of said processing/lock state detecting means when the logical operations executed by said processing/lock state detecting means indicate a locking tendency of a respective wheel.

2. An antilock control device comprising:
    a wheel speed detecting means;
    a processing/lock state detecting means for executing logical operations on the basis of wheel speed signals supplied from said wheel speed detecting means and for effecting antilock control by selectively issuing commands to reduce, hold or increase a brake pressure in accordance with the executed logical operations;
    a solenoid actuating means for actuating solenoids for pressure control valves in brake pressure circuits in response to said commands to reduce, hold or increase a brake pressure from said processing/lock state detecting means when said processing/lock state detecting means is activated to effect the antilock control;
    a brake pedal position detecting means for detecting whether a brake pedal is in its operative ON or inoperative OFF position; and
    a control means operatively connected to said brake pedal position detecting means and for activating the antilock control of said processing/lock state detecting means while the brake pedal is in its inoperative OFF position, and initializing means for initially deactivating the antilock control of said processing/lock state detecting means when said brake pedal position detecting means detects that said brake pedal has changed from its inoperative OFF position to its operative ON position and said control means subsequently reactivating the antilock control of said processing/lock state detecting means when the executed logic operations of said processing/lock state detecting means indicate a locking tendency of a respective wheel.

* * * * *